United States Patent [19]

Fetcenko et al.

[11] Patent Number: 4,893,756
[45] Date of Patent: Jan. 16, 1990

[54] HYDRIDE REACTOR APPARATUS FOR HYDROGEN COMMINUTION OF METAL HYDRIDE HYDROGEN STORAGE MATERIAL

[75] Inventors: Michael A. Fetcenko, Royal Oak; Thomas Kaatz, Drayton Plains; Steven P. Sumner; Joseph LaRocca, both of Warren, all of Mich.

[73] Assignee: Energy Conversion Devices, Inc., Troy, Mich.

[21] Appl. No.: 247,569

[22] Filed: Sep. 22, 1988

[51] Int. Cl.⁴ .............................................. B02C 19/12
[52] U.S. Cl. ........................................ 241/33; 241/1; 241/65; 241/69; 241/301
[58] Field of Search .................... 241/1, 301, 69, 65, 241/33, DIG. 14

[56] References Cited

U.S. PATENT DOCUMENTS 4,630,779 12/1986 Suuchi et al. .......................... 241/1

FOREIGN PATENT DOCUMENTS 533208 11/1958 Canada .

*Primary Examiner*—Mark Rosenbaum
*Attorney, Agent, or Firm*—Kenneth M. Massaroni; Richard M. Goldman; Marvin S. Siskind

[57] ABSTRACT

Apparatus for the hydride-dehydride cycling comminution of metal hydride, hydrogen storage alloy materials, which comminuted hydrogen storage alloy material is adapted for use in the negative electrode of hydrogen storage, electrochemical cells.

25 Claims, 3 Drawing Sheets

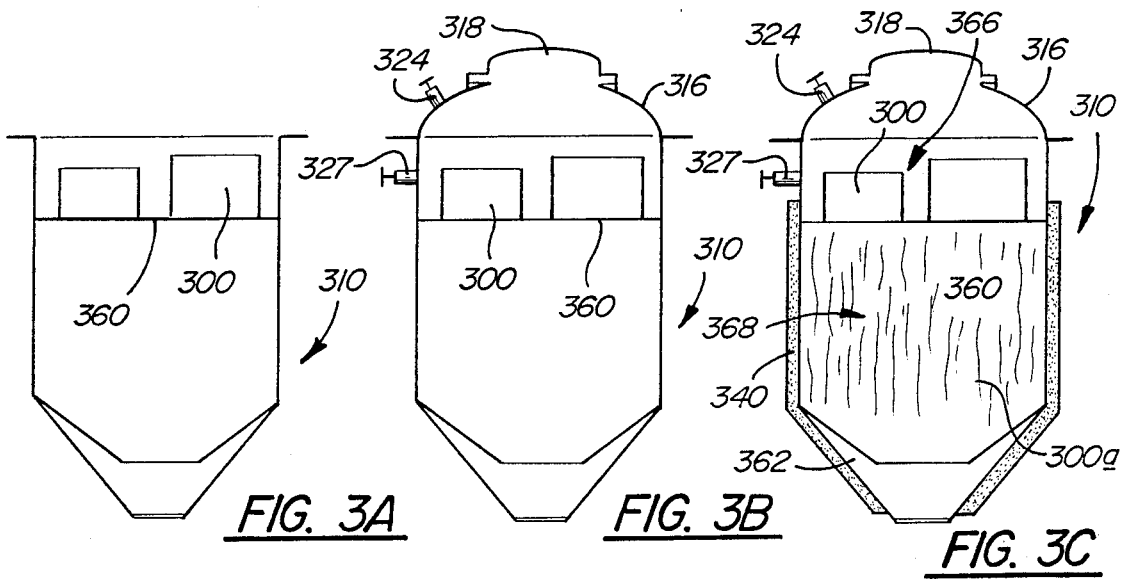
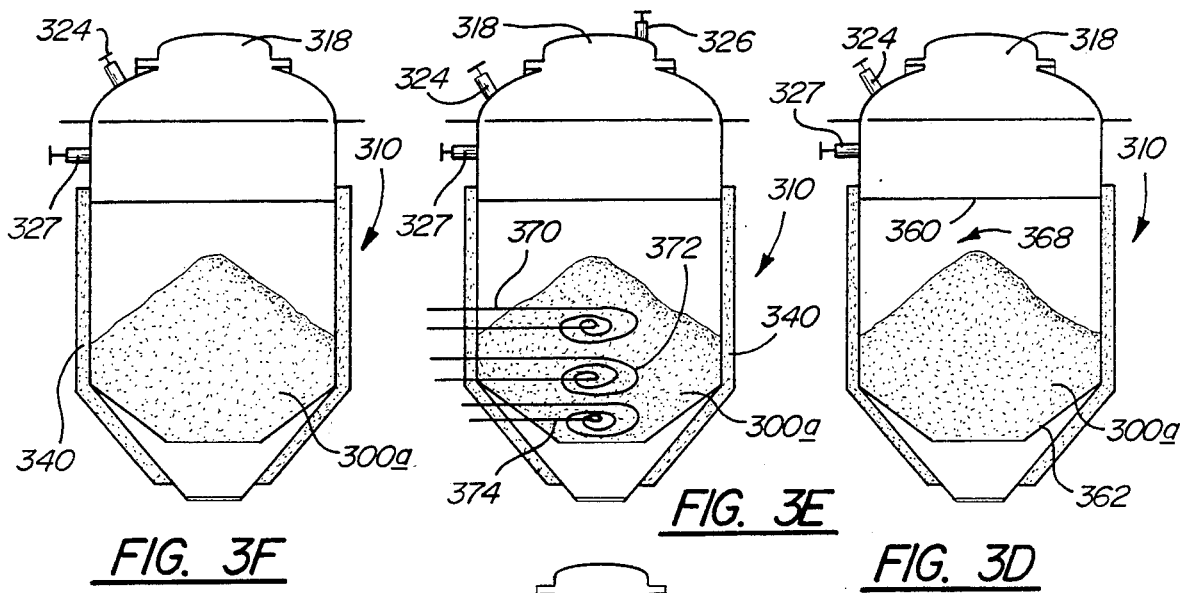
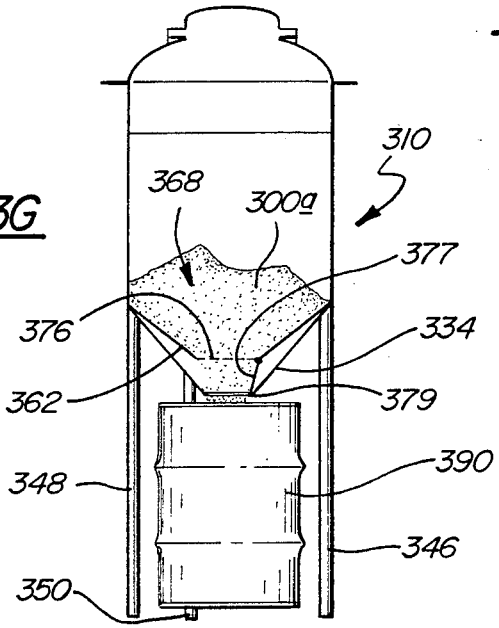

HYDRIDE REACTOR APPARATUS FOR HYDROGEN COMMINUTION OF METAL HYDRIDE HYDROGEN STORAGE MATERIAL

FIELD OF THE INVENTION

The present invention relates generally to the manufacture of metal hydride, hydrogen storage alloy materials for use in rechargeable electrochemical cells. More particularly, the present invention relates to an apparatus for hydride-dehydride cycling comminution of bulk metal hydride, hydrogen storage alloy material.

BACKGROUND OF THE INVENTION

Secondary cells using rechargeable, metal hydride, hydrogen storage alloy negative electrodes represent the latest major innovation in the rapidly evolving area of battery technology. This is particularly true in cells utilizing hydrogen storage negative electrodes based upon vanadium-zirconium-titanium-nickel-chromium type hydrogen storage alloys, rather than older, less oxidation resistant, higher cost alloys such as those based upon lanthanum-nickel alloys. These cells operate in a different manner than lead-acid, nickel-cadmium or other prior art battery systems. The hydrogen storage electrochemical cell utilizes a negative electrode that is capable of reversibly, electrochemically storing hydrogen. In one exemplification the cell employs a positive electrode of nickel hydroxide material, although other positive electrode materials may be used. The negative and positive electrodes are spaced apart in an alkaline electrolyte, and may include a suitable separator, spacer, or membrane therebetween.

Upon application of an electrical current to the negative electrode, the negative electrode material (M) is charged by the absorption of hydrogen:

$$M + H_2O + e^- \rightarrow M\text{-}H + OH^- \quad \text{(Charging)}$$

Upon discharge, the stored hydrogen is released to provide an electric current:

$$M\text{-}H + OH^- \rightarrow M + H_2O + e^- \quad \text{(Discharging)}$$

The reactions are reversible.

The reactions that take place at the positive electrode are also reversible. For example, the reactions at a conventional nickel hydroxide positive electrode as utilized in a hydrogen rechargeable secondary cell or battery are:

$$Ni(OH)_2 = OH^- \rightarrow NiOOH + H_2O + e^- \quad \text{(Charging)}$$

and $$NiOOH + H_2O + e^- \rightarrow Ni(OH)_2 + OH^- \quad \text{(Discharging)}.$$

A cell utilizing an electrochemically rechargeable, metal hydride hydrogen storage negative electrode offers important advantages over conventional secondary batteries. Rechargeable hydrogen storage negative electrodes offer significantly higher specific charge capacities (ampere hours per unit mass and ampere hours per unit volume) than do either lead negative electrodes or cadmium negative electrodes. As a result of the higher specific charge capacities, a higher energy density (in watt hours per unit mass or watt hours per unit volume) is possible with hydrogen storage batteries than with the prior art conventional systems, making hydrogen storage cells particularly suitable for many commercial applications.

Suitable active materials for the titanium-nickel type metal hydride, hydrogen storage alloy are disclosed in commonly assigned U.S. Pat. No. 4,551,400 to Sapru, Hong, Fetcenko and Venkatesan for HYDROGEN STORAGE MATERIALS AND METHODS OF SIZING AND PREPARING THE SAME FOR ELECTROCHEMICAL APPLICATION incorporated herein by reference. The materials described therein store hydrogen by reversibly forming hydrides. The materials of Sapru, et al have compositions of:

$$(TiV_{2-x}Ni_x)_{1-y}M_y$$

where $0.22 \leq x \leq 1.0$, $0 \leq y \leq 0.2$ and $M = Al$ or $Zr$;

$$Ti_{2-x}Zr_xV_{4-y}Ni_y$$

where $0 \leq x \leq 1.5$, $0.6 \leq y \leq 3.5$; and $$Ti_{1-x}Cr_xV_{2-y}Ni_y$$

where $0 \leq x \leq 0.75$, $0.2 \leq y \leq 1.0$

Reference may be made to U.S. Pat. No. 4,551,400 for further descriptions of these materials and for methods of making them.

Other suitable materials for the negative electrode are disclosed in commonly assigned copending U.S. Pat. Application Ser. No. 947,162 filed Dec. 29, 1986 now U.S. Pat. No. 4,728,586 issued Mar. 1, 1988 in the names of Srinivasen Venkatesan, Benjamin Reichman, and Michael A. Fetcenko for ENHANCED CHARGE RETENTION ELECTROCHEMICAL HYDROGEN STORAGE ALLOYS AND AN ENHANCED CHARGE RETENTION ELECTROCHEMICAL CELL, incorporated herein by reference. As described in the Venkatesan, et al reference, one class of particularly desirable hydrogen storage alloys comprises titanium, vanadium, zirconium, and nickel, and at least one metal chosen from the group consisting of copper, iron, manganese, cobalt, and chromium. The preferred alloys described in Venkatesan, et al are alloys of titanium, vanadium, nickel, zirconium, and chromium, especially alloys having the composition represented by the formula:

$$(Ti_{2-x}Zr_xV_{4-y}Ni_y)_{1-z}Cr_z$$

where x is between 0.0 and 1.5, y is between 0.6 and 3.5, and z is an effective amount less than 0.20.

The hydrogen storage alloy is formed in bulk ingot form from a high temperature melt of precursor active material. The production of hydrogen storage negative electrodes utilizing the preferred materials is difficult because these preferred hydrogen storage active materials are not only not ductile, but are in fact, of relatively great or high hardness. Indeed, these alloys can typically exhibit Rockwell "C" ($R_C$) hardnesses of 45 to 60 or more. Moreover, in order to attain high surface areas per unit volume and per unit mass, the alloy must be in the form of small particles. In a preferred exemplification, the hydrogen storage alloy powder must pass through a 200 U.S. mesh screen, and thus be smaller than 75 microns in size (200 U.S. mesh screen has interstices of about 75 microns). Therefore, the bulk ingots of hydrogen storage alloy material must be comminuted, e.g., crushed ground, milled, or the like, before the hydrogen storage material is pressed into electrode form. It is this hydrogen storage alloy powder which is utilized in the manufacture of the electrode.

Comminution of bulk ingots of metal hydride, hydrogen storage alloy material is made more difficult by the fact that the materials described herein are quite brittle, and therefore do not easily break into particles of uniform size and shape. Early attempts to provide apparatus or methods for size reduction of these type materials proved altogether inadequate due to the extreme hardness of the hydrogen storage alloy materials. Normal/conventional size reduction techniques employing devices such as jaw crushers, mechanical attritors, ball mills, and fluid energy mills consistently fail to economically reduce the size of such hydrogen storage materials. Grinding and crushing techniques have also proven inadequate for initial reduction of ingots of hydrogen storage alloy material to intermediate sized (i.e. 10–100 mesh) particles.

Attempts to embrittle the hydrogen storage alloy material as by immersion in liquid nitrogen so as to make size reduction more easily achieved are inadequate because: (1) the materials are not sufficiently embrittled; (2) they introduce embrittlement agents which have an undesirable effect upon the electrochemical properties of the hydrogen storage alloy material; and (3) as said materials become more brittle, it becomes increasing difficult to get uniformly sized particles of materials. Other methods for embrittling metals are disclosed, for example, in Canadian Patent No. 533,208 to Brown. Brown, however, identifies many disadvantages of treating vanadium metal (a component of the metal hydride, hydrogen storage alloy material) with hydrogen gas. Brown prefers rather using cathodic charging as a size reduction technique.

The aforementioned commonly assigned U.S. Pat. No. 4,451,400 teaches using hydrogen for sizing and preparing hydrogen storage alloy materials. However, said reference is woefully inadequate in the teaching of an integrated apparatus for accomplishing each of the steps necessary to comminute the hydrogen storage alloy. Specifically, the method discussed in said '400 reference, while useful for teaching a method of comminuting said materials, does not suggest an apparatus which can efficiently and in a cost effective manner comminute large quantities of hydrogen storage alloy in ingot form while assuring substantial uniformity of particle size.

Accordingly, there exists a need for an apparatus adapted to provide intermediate size reduction of hydrogen storage alloy materials by hydride-dehydride cycling comminution.

SUMMARY OF THE INVENTION

There exists a need for an apparatus capable of intermediate size reduction of metal hydride hydrogen storage materials from the synthesized, bulk form to a particulate form usable in, for example, rechargeable electrochemical cells. Thus, to satisfy this need, there is disclosed herein an apparatus for intermediate size reduction of metal hydride, hydrogen storage materials, said apparatus comprising a reactor body having a substantially hollow interior volume. The volume is divided into two regions: a comminuting first region and a second region adapted for collection of particulated hydrogen storage material. Said apparatus further includes at least one hydrogen reaction gas inlet valve and at least one hydrogen reaction gas outlet valve formed through the walls of said reactor body. Electric resistance heating means are disposed within the interior volume of said reactor body for maintaining the interior volume at an elevated temperature. A cooling means, such as a cooling jacket is concentrically disposed around the outer diameter of said reactor body so as to maintain the interior volume thereof at a substantially reduced temperature. The reactor further includes loading port means adapted to easily load metal hydride hydrogen storage materials in bulk form into said reactor body and unloading port means adapted to easily unload powdered product of said metal hydride hydrogen storage material.

The apparatus of the instant invention further includes a reaction stage operatively disposed between said first and second regions. The reaction stage supports bulk hydrogen storage materials in the comminuting first region while allowing said hydrogen reaction gas to flow freely around the entire surface area of said bulk materials so as to more cost efficiently comminute them from the bulk form to the powdered form. Comminution of the bulk hydrogen storage alloy materials forms flakes, which flakes fall freely through the reaction stage, collecting in the lower, collection region, in a powder bed fashion, for easy subsequent unloading. The flakes so prepared are typically about 100 standard U.S. mesh size.

The invention disclosed herein provides several advantages over prior art devices. Specifically, the apparatus of the instant invention provides for maximum throughput of material while providing economical savings of time, floor space, and raw materials. The instant invention further provides significant safety advantages over prior art devices by minimizing: (1) transfer of materials and therefore exposure to oxidizing atmospheric condition; (2) the potential for clouds of said powdered particles; (3) loss of hydrogen gas. These and other practical advantages are demonstrated in greater detain hereinbelow.

BRIEF DESCRIPTION OF THE DRAWINGS

FIGS. 3A–3G are a series of schematic views of the hydride reactor, presented for illustrating the operation thereof.

DETAILED DESCRIPTION OF THE INVENTION

The Apparatus

Figure 1:
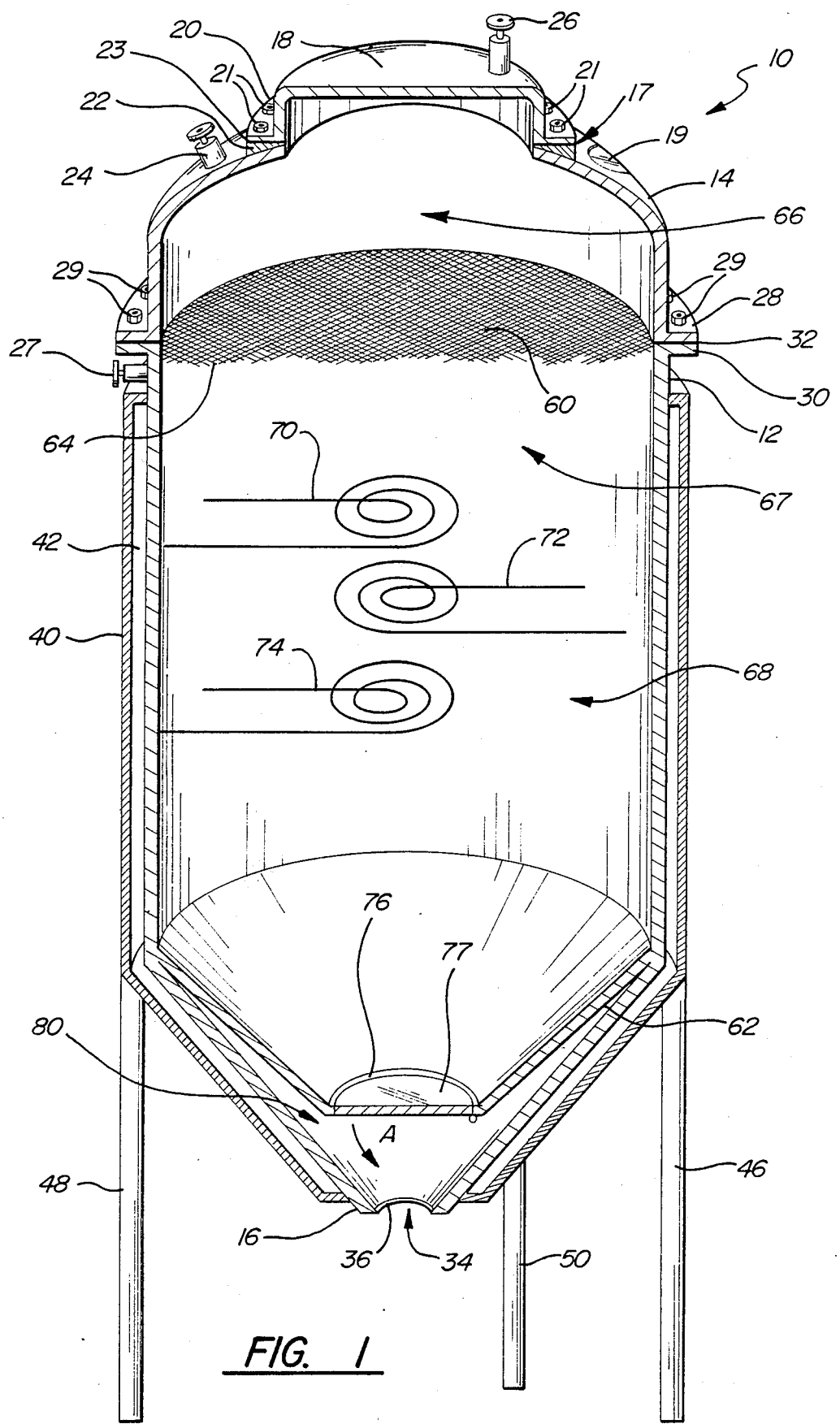
FIG. 1 is a perspective view, in cutaway, of the hydride reactor of the instant invention.

Referring now to FIG. 1, there is illustrated therein, a perspective view, in cutaway, of the hydride reactor apparatus 10 of the instant invention. The hydride reactor apparatus 10, is a generally cylindrical, hollow vessel 12, fabricated from materials adapted to withstand extremes of both temperature and pressure. The hydride reactor vessel 12 is typically fabricated from materials selected from the group consisting of iron, steel, stainless steel and other alloys and combinations thereof. In a preferred embodiment, the vessel 12 is fabricated from stainless steel, which material is well adapted to withstand the temperature and pressure levels required in ordinary operation for the apparatus 10, (i.e., temperatures between $-50°$ and $500°$ Centigrade; pressures from below about $10^{-4}$ torr to at least about 300 psi).

As may be further appreciated from a perusal of FIG. 1, the vessel 12 includes an upper, detachable, hemi-spherical end portion 14 and lower, conical end portion 16 integrally formed with said generally cylindrical vessel 12. Hemi-spherical end portion 14 is detachably mounted upon the terminal end of cylindrical vessel 12 opposite integrally formed conical end portion 16, and said hemi-spherical portion 14 is adapted to be the upper, loading portion of the apparatus 10. The hemi-spherical portion 14, which is fabricated from materials such as those disclosed hereinabove for the fabrication of said vessel 12, further includes a loading port region 17 and loading port hatch 18 for loading bulk metal, hydrogen storage alloy material, in ingot form, into said apparatus 10. The loading port hatch 18 includes flange 20 which may be fitted to flange 22 of hemi-spherical portion 14 as by bolts 21, (or alternatively by a hinge/latch mechanism) so as to ensure a completely air and vapor tight closure therebetween. The integrity of the closure is assured by a vacuum seal gasket 23 disposed between said flanges 20 and 22.

The reaction vessel 12 includes several valves for the introduction, and evacuation of gases therefrom. For example, hemi-spherical end portion 14 is further equipped with at least one reaction gas inlet/outlet valve, and at least one pressure relief valve. In a preferred embodiment, the hemi-spherical end portion 14 is equipped with two valves 24 and 26; valve 24 is adapted for connection to a source of reaction gas, (not shown) which gas is, in a preferred embodiment, hydrogen gas ($H_2$); and valve 26 is preferably formed through loading hatch 18. It is to be noted that valve 26 is employed for pressure means to assure that a preselected, uniform pressure level is accurately maintained within the interior volume of said vessel 12. The reactor vessel 12 includes a third valve 27 formed through the side thereof, and adapted for connection to vacuum pump means (not shown) so that (1) the hollow interior volume of said vessel 12 may be evacuated to sub-atmospheric pressure; and (2) the desorbed hydrogen gas may be easily removed from the interior of vessel 12. The valve must be capable of accommodating at least a 2–4 inch diameter evacuation tube.

Hemi-spherical end portion 14 is detachably mounted upon cylindrical vessel 12, so as to effect an air tight, vapor tight seal therebetween. The hemi-spherical end portion 14 includes flange 28 which may be fitted to flange 30 of the cylindrical vessel 12, and sealed as by bolts 29. The integrity of the closure is assured by a vacuum seal 32 disposed between said flanges. Hemi-spherical end portion 14 is made detachable so as to further facilitate loading of bulk hydrogen storage alloy material. The detachable end portion also allows easy access to the interior volume of said vessel, so as to allow for periodic cleaning and maintenance thereof. Hemi-spherical end portion 14 may also include at least one vacuum-tight viewing port 19 formed therethrough, so as to allow operator inspection of the interior of said vessel 12 during operation.

Conical end portion 16 is integrally formed with the terminal end of cylindrical vessel 12 opposite hemi-spherical end portion 14, and is adapted to provide easy unloading of metal hydride hydrogen storage alloy powder, which powder is the result of hydride-dehydride cycling comminution of bulk metal hydride, hydrogen storage alloy material. Conical end portion 16 is equipped with an unloading port 34 formed through said conical portion at the narrowest port thereof; i.e., port 34 is formed in the apex of the cone so that powdered material will collect in said cone to be easily removed through said port 34. The port 34 further includes a removable plug (not shown) and seal means 36 adapted to effect an air-tight, vapor-tight seal between the interior volume of said vessel 12 and ambient conditions. In a preferred embodiment, the seal means is a pneumatic pressure vacuum valve. This allows comminuted metal hydride, hydrogen storage alloy material to be unloaded from the unloading region 80 without exposure to oxidizing conditions.

The apparatus 10 further includes means, preferably, substantially concentrically disposed about said vessel 12, for maintaining said vessel 12 at reduced temperatures. As illustrated in FIG. 1, said means is preferably a cooling jacket 40 disposed around the outer diameter of vessel 12 and conical end portion 16. The cooling jacket 40, which may include, for example, baffles, is adapted to circulate a liquid cooling medium, such as water, ammonia or liquid nitrogen, around said vessel. Alternatively, the cooling medium may be gas, such as forced air or freon circulated about the vessel 12. It is to be understood that the cooling means may be disposed around the inside diameter or within the hollow interior volume, (as by conduit means) of the vessel 12. Cooling jacket 40 may further define a void volume 42 to further insulate said vessel from ambient temperatures. In a preferred embodiment, said cooling jacket 40 can be drained of cooling media, and filled with other media, such as hot water or hot oil, so as to warm said vessel, as required.

Attached to said vessel 12, or alternatively to said cooling jacket 40 are means for supporting said reactor vessel 12. As is illustrated in FIG. 1, the support means comprise legs 46, 48 and 50, metallurgically affixed, e.g., welded to said cooling jacket 40. Said legs should be of a length to allow said vessel 12 to be supported at a height above the ground which is sufficient to allow collection containers to easily pass beneath the unloading port 34, such that unloading of comminuted hydrogen storage alloy material is accomplished primarily by gravity.

The reactor vessel 12 of the hydride reactor apparatus 10 has a substantially hollow, interior volume divided into two regions by a reaction stage 60; a first upper comminution region 66 and a second, lower collection region 67. The lower collection region 67 is divided into two zones by a collection basin 62; an upper heating zone 68 and a lower unloading zone 80. The reaction stage 60 is a perforate support, preferably fabricated from a heavy gauge wire mesh screen 64, which is adapted to support bulk, hydrogen storage alloy material, in ingot form in the upper, first, comminution region 66. Alternatively, the reaction stage 60 may be fabricated from, for example, a series of ceramic, interconnected rings of a preferred, preselected size. The size of the openings in said reaction stage are adapted to support at least about 300 lbs. of hydrogen storage alloy ingots, while providing enough open space for particulated matter to readily fall into a collection region, without binding to or accumulating upon the screen. The screen also assures that comminuted powder falls into a powder bed of relatively low density in the collection region. The reaction stage 60 may further include a mechanical vibrator attached thereto for assuring an appropriately packed bed of hydrogen storage alloy material while preventing said material from accumulating upon said screen.

Bulk metal alloy ingots of hydrogen storage alloy material are loaded upon the screen 64 in the comminution region 66, where, after said vessel is evacuated, said materials are exposed to a flow of a reaction gas such as $H_2$ gas. Said reaction gas hydrides the hydrogen storage alloy material, causing changes in the specific volume of the alloy material per unit metal atom. Specifically, as the hydrogen storage alloy absorbs $H_2$ gas, the metal lattice thereof expands up to about 20 volumetic percent, thereby causing said alloy to fracture. This fracturing of said alloy material comminutes said bulk alloy material to particles of approximately 80–100 mesh size. These particles drop through said screen 64 to be collected in the collection basin 62 of the heating zone 68. It should thus be appreciated that the size of the mesh of the screen 64 must be at least greater than the size of the comminuted particles.

The heating zone 68, which is integrally formed with the walls of cylindrical vessel 12, further includes at least one and preferably three electric resistance heating coils 70, 72 and 74 adapted to radiate and conduct heat into said lower, heating zone 68, so as to maintain said region at an elevated temperature. The heating coils may alternatively be conductive, convective, radiative, and combinations thereof. The electric resistance heating coils 70, 72, and 74 may be replaced with other heat sources such as heat tubes, steam, circulated oil, microwave energy, fluidized beds, radiant heaters, quartz heaters and combinations thereof. Alternatively (or additionally), a heated medium may be circulated through the cooling jacket 40. The heating coils further include temperature sensors for monitoring the temperature of the comminuted hydrogen storage alloy in the collection region 68. Said sensors (not shown) provide feedback control to the heating coils so that heating is maximized without exceeding 500° Centigrade, since such elevated temperatures can deleteriously effect the performance of the alloy material in electrochemical cells (of course this is dependent upon a number of different variables such as specific alloy composition, or duration of exposure to over-temperature).

The collection basin 62 further includes a collection basin drain 76 formed through the bottom thereof. As may be appreciated from a perusal of FIG. 1, collection basin 62 is formed as an inverted, truncated cone, with the collection basin drain 76 formed through the narrowest portion, i.e., the bottom thereof. The collection basin drain 76 may be closed by trap door 77, so as to collect comminuted hydrogen storage alloy material in the heating zone 68. The trap door 77 may function as, for example, an iris or overlapping flaps. In a preferred embodiment, the trap door 77 is a single hinged flap adapted to swing away from the collection basis 76 in the direction of Arrow A. The function of the collection basin 62 is to hold the collected, comminuted hydrogen storage alloy in close proximity to the heating coils 70, 72, 74, so as to heat said materials, thereby effusing hydrogen therefrom, while isolating the heated, comminuted material away from the unloading port 34 in unloading zone 80. This isolation is necessary to prevent the heated comminuted hydrogen storage alloy material from destroying seal means 36 and thereby breaking vacuum.

In operation, the communited metal hydride hydrogen storage alloy material is allowed to cool in the heating zone 68 before opening trap door 77 to empty said material through said drain 76 into unloading zone 80. As may be appreciated from FIG. 1, the trap door 77 is adapted to swing downward, in the direction of arrow A, to facilitate powder flow. It is important to note that unloading port 34 may be further adapted for vacuum connection to an unloading drum (not shown) positioned therebeneath.

Figure 2:
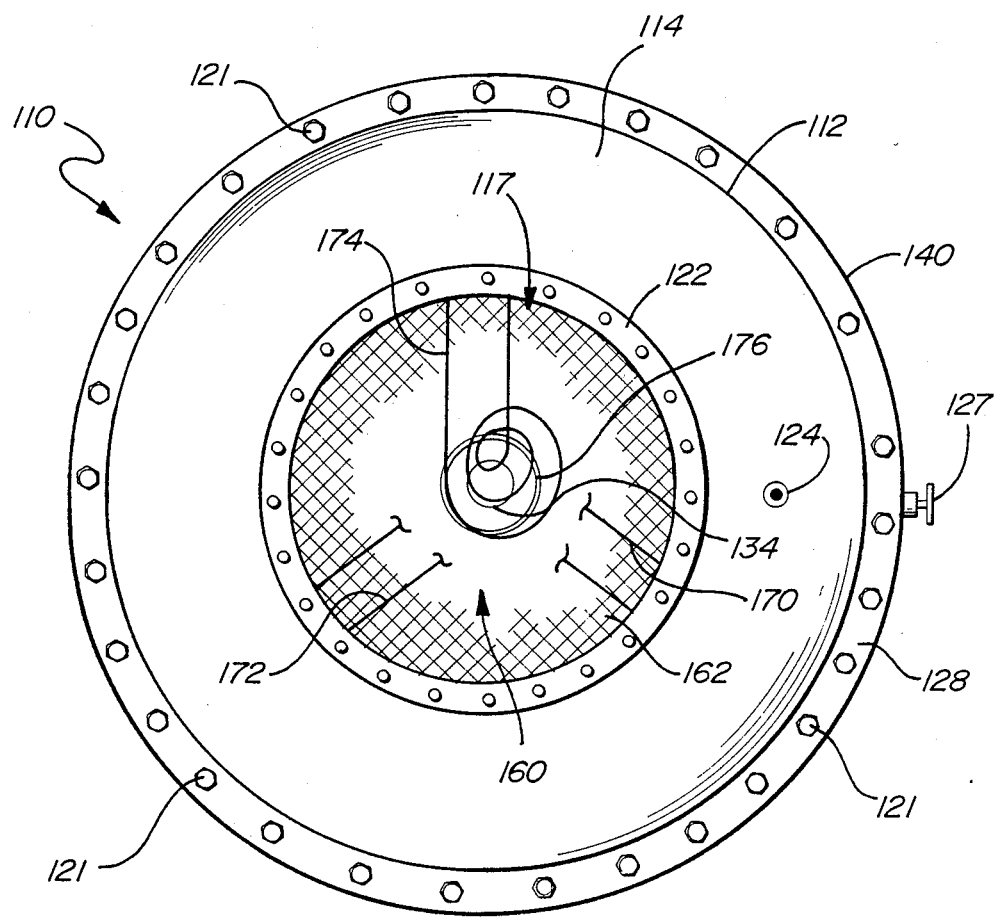
FIG. 2: is a top plan view of the hydride reactor of the instant invention, with the loading port means thereof removed so as to provide a view of the interior volume of said hydride reactor.

Referring now to FIG. 2, there is illustrated therein a top plan view of said hydride reactor 110. Specifically illustrated is the upper hemi-spherical portion 114 with loading port 117 open, (i.e. loading port hatch 18 of FIG. 1 is removed), though lower flange 122 to which loading port hatch 118 is affixed is clearly visible. Hemispherical end portion 114 is affixed to the apparatus 110 by bolts 121. Also visible in the interior of said vessel 112, partially in cut-away, is the wire mesh screen 162 of reaction stage 160; unloading port 134; and electric resistance heating coils 170, 172 and 174, (coils 170 and 172 in partial cut-away) evenly deployed around the interior of said vessel 112. Also illustrated in FIG. 2 is the gas inlet port 124 and evacuation port 127 respectively, as well as the concentrically disposed cooling jacket 140. Collection basin drain 176 is also clearly illustrated, (with trap door 176 in the open position) as directly above unloading port 134.

The Operation Of The Hydride Reactor Apparatus

In operation, the hydride reactor of FIGS. 1 and 2 is employed to perform a hydride-dehydride cycling comminution process which reduces metal hydride, hydrogen storage alloy material from large ingot/bulk size to particles averaging approximately 80–100 standard U.S. mesh size. Approximately 350 lbs. of said bulk ingots, (each ingot weights approximately 60–80 lbs.) are loaded into said reactor through loading port 17 of FIG. 1, and onto the wire mesh screen 62 of reaction stage 60. The loading port hatch 18 is closed and sealed thereby effecting an air-tight, vapor-tight seal between the interior volume of said vessel 12 and ambient conditions. Thereafter, the interior volume of said vessel 12 is evacuated to a pressure of about 100 microns or less through valve 27 of FIG. 1. The interior of vessel 12 may then be re-purged with argon, and again evacuated to 100 microns. Thereafter, hydrogen, in the form of $H_2$ gas, is fed through valve 24 into the vessel 12 pressurizing said vessel to at least about 25 psi. The hydrogen so introduced is absorbed by the metal alloy ingot causing the hereinabove discussed 20 volumetic percent expansion of the metal lattice, thereby creating cracks and fissures in said ingots of metal hydride, hydrogen storage material, and occupying certain interestitial sites in said ingot, causing fracturing and comminution of the material. Indeed, as hydrogen is introduced into vessel 12, an audible cracking and pulverizing of the ingot is observed. The introduced hydrogen "blasts" the ingots of bulk materials into a "rubble" consisting of particles averaging about 80–100 mesh size. Under preferred circumstances, the reaction rate is controlled and the complete hydride reaction may take up to several hours.

The hydrogen remains in said rector vessel 12 for at least about 3 hours, while cooling media is allowed to circulate through the concentrically disposed cooling jacket 40, thereby removing the heat of the exothermic hydride reaction, (i.e., approximately 10 Kcal/mole $H_2$). Thereafter, heat is applied to the metal hydride powder, as by electric resistance heating coils 70, 72 and 74. The applied heat causes hydrogen to effuse from said powdered, metal hydride, hydrogen storage alloy material. This heating/effusion process is carried out for at least about 3 hours, at a temperature which is ramped up to 500° Centigrade. Initially, effused hydrogen is allowed to accumulate and pressurize the interior volume of vessel 12, to the pressure level setting of the pressure relief valve 26 of FIG. 1, which is, in a preferred embodiment approximately 35 psig. As the hydrogen continues to effuse, the reactor is evacuated through valve 27 by the attached vacuum system (not shown) by carefully releasing excess hydrogen to atmospheric pressure and opening the interior hollow volume of vessel 12 to the vacuum system. This is allowed to continue until a preselected temperature and pressure level is achieved, indicating the desired amount of hydrogen has been removed. The powdered metal hydride material is then allowed to cool, in situ, over a period of about 24 hours to a temperature less than about 50° Centigrade, in an argon atmosphere. Cooling time may be substantially reduced.

The resulting material is a particulate, (approximately 80-100 mesh) metal hydride, hydrogen storage material which can then be adapted for use as the negative electrode material in a metal hydride, hydrogen storage electrochemical cell. It is noteworthy that employing the hydride reactor of the instant invention provides several advantages over prior art devices. These advantages include: (1) reduced cost of hydrogen used in hydride-dehydride cycling, in that virtually all of the hydrogen used in the comminution process is recoverable and recyclable; (2) by far the most efficient comminution system heretofore developed for quickly and efficiently fracturing metal hydride material to uniform, usable sizes; (3) operation which is essentially operator-free (except for loading and unloading); (4) general ease of use in that the reactor: (a) allows for easy loading and unloading of large amounts of material; and (b) was a minimum amount of floor space for set-up and operation; (5) the addition of the reaction stage provides a way to assure uniformity of exposure of the ingot of material to the reaction gas, and uniformity of particle size; and (6) tremendously enhanced safety versus prior art devices. It is noteworthy that two or more of such apparatus may be arranged in a series type configuration, wherein hydrogen effused from a first apparatus during dehydriding is fed directly into a second apparatus for hydriding, to achieve hydride-dehydride cycling comminution of a second batch of metal hydride, hydrogen storage alloy material.

EXAMPLES

Described hereinbelow is one example of the processing of one batch of hydrogen storage alloy material with the hydride reactor of the instant invention. FIGS. 3A-3G are schematic representations provided to help illustrate the operation of the hydride reactor.

Approximately 350 lb. of hydrogen storage alloy material, in bulk ingot form 300, having a nominal composition (atomic percentage) of $V_{22}Ti_{16}Zr_{16}Ni_{39}Cr_7$ were loaded upon the reaction stage 360 in the reactor apparatus 310, as is illustrated in FIG. 3A. As may be appreciated from FIG. 3A, spherical end portion 14 of FIG. 1 has been removed to facilitate loading of ingots of material. Alternatively, ingots may be loaded through loading port 17 of FIG. 1. Bulk ingots of hydrogen storage alloy material typically weigh no more than about 70 lbs. apiece. This is due to the fact that naturally occurring residual ingot stresses cause said ingots to break during the cooling thereof from the initial alloying melt. It is important to note that as long as one small surface of any size ingot of hydrogen storage alloy material is "clean" (as defined herein "clean" refers to the less stable surface which forms on the above mentioned hydrogen storage alloys at room temperature and standard atmospheric conditions; this is as opposed to more stable, dense oxides which form at the elevated temperatures experience in the initial melt operation), hydriding thereof will commence upon introduction of hydrogen thereto. To assure that hydriding does commence, it may be possible to use, for example, a hammer and chisel to chip off at least about a quarter inch segment of the ingot to provide an initial penetration point which allows hydrogen to be absorbed into the structure of the ingot.

After loading the hydrogen storage alloy material 300 into the reactor apparatus 310, hemi-spherical end portion 314, (or alternatively loading port 318) was replaced in position, and secured so as to form an air tight, water tight, vapor tight seal between the interior volume of said chamber and ambient conditions, as illustrated in FIG. 3B. Thereafter, the interior volume of said reactor apparatus 310 was evacuated to approximately 50 millitorr by a vacuum system (not shown) connected to valve 327. The apparatus was then purged with argon, introduced into the interior of the vessel through valve 324 from a source of argon (not shown). This process was repeated at least twice.

Thereafter, as is illustrated in FIG. 3C, a source of hydrogen reaction gas such as hydrogen gas (99.99% purity) was introduced through valve 324 into the interior volume of said reactor apparatus 310 to a regulated pressure of approximately 25 psig. It is interesting to note that the hydriding comminution process commenced immediately, and unassisted. This comminution process caused the ingots of hydrogen storage alloy material 300 to fracture into flakes 300a of material which fell from the comminution region 366 through screen 360 into the collection region 368 and onto collection basin 362. The degree of hydriding can be calculated by monitoring the amount of hydrogen which has been used from the known quantity available in the initial reservoir. As hydrogen was introduced into the interior volume of said vessel, a cooling medium such as water was allowed to circulate through the concentrically disposed cooling jacket 340. Cooling jacket 340 maintained the interior volume of the reactor apparatus at approximately 100° Centigrade, thereby removing excess heat generated by the exothermic hydriding reaction, (i.e. approximately 10Kcals/mole $H_2$ gas). It is noteworthy that the cooling jacket 340 plays a vital role in the overall operation of the apparatus 310, since the same hydriding reaction conducted without the benefit of cooling, yields powder temperatures in excess of 500° Centigrade, which extreme temperatures lengthen the process time and slow the hydrogen absorption rates.

Since the reaction was allowed to proceed at a faster pace with cooling, size reduction of the bulk ingot of alloy hydrogen storage alloy material was actually improved, by an appreciable, though as yet unquantified amount. The hydride reaction was considered complete when the hydrided material no longer generated heat, i.e., when the material had cooled to approximately room temperature, e.g. approximately 16 hours. The size reduction or comminution reaction was considered complete much sooner however, and can be based upon the hydrogen absorption rate so that the process time can actually be reduced substantially, in fact probably to less than four hours. Hydrogen absorbed by said hydrogen storage alloy material has been calculated to be approximately 1.2 weight percent. As can be appreciated in FIG. 3D, hydriding is completed when all of the comminuted material 300 has been collected in the collection basin 362 of the comminution region 368, though some residual material may remain on reaction stage 360.

After the hydriding process was completed, it was necessary to desorb or effuse the hydrogen from the hydrogen storage alloy material. As is shown in FIG. 3E, hydrogen removal began by venting excess hydrogen from the interior of apparatus 310 through valve 327 and using an argon purge with argon introduced through valve 324. The cooling medium in said cooling jacket 340 was drained so as to no longer provide a cooling effect.

Temperature sensors associated with heating coils 370, 372 and 374 report that after the hydrogen is vented or evacuated, the temperature of the material quickly fell to approximately 0° Centigrade under vacuum. Thereafter, as is illustrated in FIG. 3E, heating began to cause hydrogen to effuse from the metal hydride hydrogen storage material, and accumulate within the reactor apparatus 310. Hydrogen was allowed to accumulate within said apparatus 310 until the pressure approached the pressure relief valve setting of approximately 35 psig. Pressure was allowed to continue to be relieved through said relief valve 326 until such time as the powder temperature reached approximately 380°-500° Centigrade. The temperature itself depends on the proximity of hydrogen storage alloy powder to the electrical resistance heating coils 370, 372 and 374. The step of effusing substantially all of the hydrogen from the comminuted hydrogen storage alloy material 300a typically takes up to approximately 8–10 hours. Hydrogen effused in this manner may be collected, compressed, stored and reused in subsequent cycles.

Turning now to FIG. 3F, the vessel was next (i.e. after 8–10 hours) evacuated via valve 327 initially to a pressure of about 1–10 torr, and thereafter to a pressure of about 400 millitorr after approximately 4 hours at which point sufficient amounts of hydrogen had been removed. Argon gas was backfilled to a pressure of approximately 25 psi through valve 324. Thereafter, the cooling water was slowly reintroduced to the concentrically disposed cooling jacket. For convenience, the reactor is usually left to cool over night, i.e., approximately 16 hours to room temperature. However, after approximately 3 hours of cooling the temperature has fallen to about 200° Centigrade. This cooling may be accelerated by adding, for example, cooling coils or recirculating gas to improve conduction and convection.

After the comminuted metal hydride, hydrogen storage alloy material had been allowed to cool, it was unloaded from said reactor vessel taking care to limit the exposure of said materials to atmospheric conditions. This was accomplished, as is shown in FIG. 3G by connecting the unloading port 334 to a storage drum 390 operatively positioned beneath the reactor vessel. Thereafter, the loading lower loading port 334 was opened, and the trap door 377 of collection basin drain 376 formed through the floor of the collection region 368 was also opened to allow the powder to fall freely thereof and through the lower loading port into the storage drum. It is important to note that operatively disposed between the floor of the interior chamber and lower loading port may be disposed a screen 379 which prevents material larger than approximately ⅛ of an inch from passing therethrough. This prevents unwanted, unduly large particles of hydrogen storage alloy material from being passed along to subsequent processing steps. Such large particles may of course be exposed to a second or subsequent hydride-dehydride cycling comminution. Practically speaking, the amount of such large particles is insignificant. During the unloading of said hydrogen storage alloy material, an argon gas purge was maintained to minimize introduction of air and other undesirable contaminants into the comminuted hydrogen storage material. This step is important from the standpoint of maintaining safety and material performance. It is to be noted that the reactor apparatus 310 is supported at a height sufficient to allow said storage drum 390 to pass therebeneath by legs 346, 348 and 350.

The material so comminuted was analyzed and found to contain 0.015 weight percent hydrogen in the following particle sizes:

| | |
|---|---|
| greater than ¼ of an inch | 3.9% |
| less than ¼ of an inch but greater than ⅛ of an inch | 3.7% |
| less than ⅛ of an inch but greater than 60 mesh | 19.6% |
| less than 60 mesh and greater than 100 mesh | 14.3% |
| less than 100 mesh and greater than 170 mesh | 37.5% |
| less than 275 mesh and greater than 325 mesh | 15.5% |
| less than 325 mesh and greater than 400 mesh | 4.3% |
| and less than 400 mesh | 1.2% |

While the invention has been described in connection with preferred embodiments and procedures, it is to be understood that the detailed description was not intended to limit the invention to the described embodiments and procedures. On the contrary, the instant invention is intended to cover all alternatives, modifications and equivalences which may be included within the spirit and scope of the invention as defined by the claims appended hereto.

We claim:

1. Apparatus for size reduction of metal hydride hydrogen storage alloy material, said apparatus comprising:
   (a) a reactor body having a substantially hollow interior volume, said volume divided into at least two regions, a comminuting first region and a collection second region;
   (b) at least one reaction gas inlet port into said hollow interior volume and one reaction gas outlet port therefrom;
   (c) heating and cooling means for maintaining said interior volume at a preferred temperature;
   (d) means for loading said materials into and unloading said materials from the interior of said reactor body; and
   (e) a rigid, wide mesh, wire screen adapted to support said hydrogen storage alloy material within said first region of said reactor body so as to provide maximum surface area exposure of said bulk materials, said wire mesh screen further adapted to provide for a uniform, low density powder bed of comminuted hydrogen storage alloy material in said second collection region to insure easy unloading thereof.

2. The apparatus as recited in claim 1, wherein said collection region further includes means for maintaining said comminuted hydrogen storage alloy material in contact with said heating means.

3. The apparatus as recited in claim 2, wherein said means for maintaining said material in contact with said heating means divides said collection region into a heating zone and an unloading zone.

4. The apparatus as recited in claim 3, wherein said means for maintaining said material in contact with said heating means is an integrally formed collection basin having an unloading door formed therein.

5. The apparatus as recited in claim 2, wherein said reactor body is adapted to withstand an internal pressure of up to 300 psi.

6. The apparatus as recited in claim 2, wherein said reactor body is adapted to maintain vacuum integrity at pressures of at least $1 \times 10^{-4}$ torr.

7. The apparatus as recited in claim 2, wherein said reactor body is adapted to withstand temperatures between $-50°$ Centigrade and $500°$ Centigrade.

8. The apparatus as recited in claim 2, wherein said cooling means includes a concentrically disposed cooling jacket adapted to circulate a cooling medium around said reactor body.

9. The apparatus as recited in claim 8, wherein said cooling jacket is operatively disposed around the outer diameter of said reactor body, and may be drained of cooling medium so as to form an insulation barrier.

10. The apparatus as recited in claim 9, wherein said cooling jacket is further adapted to circulate a heating media around said reactor body.

11. The apparatus as recited in claim 8, wherein said cooling media is selected from the group consisting essentially of water, freon, ammonia, forced air liquid nitrogen and combinations thereof.

12. The apparatus as recited in claim 2, wherein said apparatus includes at least two reaction gas inlet ports.

13. The apparatus as recited in claim 2, wherein said apparatus further includes at least one adjustable pressure relief valve.

14. The apparatus as recited in claim 13, wherein said means for maintaining the interior of said reactor body at an elevated temperature further includes at least one electric resistance heating coil.

15. The apparatus as recited in claim 14, wherein said means for maintaining the interior of said reactor body at an elevated temperature further includes three electric resistance heating coils operatively disposed in said heating zone.

16. The apparatus as recited in claim 15, wherein said three electric resistance heating coils further include sensor means for providing uniform heating within the reactor vessel.

17. The apparatus as recited in claim 12, wherein said reaction gas inlet ports include regulator means adapted to assure uniform pressure within said reactor.

18. The apparatus as recited-in claim 2, wherein the means for maintaining the interior of said reactor body at an elevated temperature is selected from the group of radiative, conductive and convective heating means.

19. The apparatus as recited in claim 18, wherein said means for maintaining the interior of said reactor body at an elevated-temperature is selected from the group consisting of heat tubes, quartz heaters, electric resistance coils, heating jacket and combinations thereof.

20. The apparatus as recited in claim 2, wherein said reaction stage is a rigid, wide mesh wire screen adapted to support said hydrogen storage alloy material within said first region.

21. The apparatus as recited in claim 20, wherein said wide mesh wire screen allows the free flow of reaction gas around said bulk hydrogen storage alloy materials supported thereupon and provides a powder bed of low density.

22. The apparatus as recited in claim 21, wherein said wire mesh screen further includes vibratory means for preventing accumulation of powdered material thereupon.

23. The apparatus as recited in claim 2, wherein said apparatus further includes means for supporting itself at a desired height.

24. The apparatus as recited in claim 23, wherein said support means comprises legs affixed to said apparatus.

25. The apparatus as recited in claim 2, wherein said apparatus further includes means for recycling reaction gas for subsequent use.

* * * * *